United States Patent [19]

Molari, Jr.

[11] Patent Number: 4,519,154
[45] Date of Patent: May 28, 1985

[54] LAMINAR STRUCTURE OF POLYCARBONATE

[75] Inventor: Richard E. Molari, Jr., Pittsfield, Mass.

[73] Assignee: General Electric Company, Pittsfield, Mass.

[21] Appl. No.: 412,979

[22] Filed: Aug. 30, 1982

[51] Int. Cl.³ .................... G09F 19/00; B32B 27/36
[52] U.S. Cl. ........................... 40/615; 428/324;
428/331; 428/412; 428/421; 428/406; 428/415;
428/418; 428/204; 428/425.6; 428/425.8;
428/448; 428/450; 428/451; 428/520; 428/913;
428/702; 428/325; 428/209; 428/210; 428/211;
350/105; 264/176 R
[58] Field of Search ............... 428/412, 421, 407, 913,
428/406, 402; 40/582, 583, 615

[56] References Cited

U.S. PATENT DOCUMENTS

| | | | |
|---|---|---|---|
| 2,379,741 | 7/1945 | Palmquist | 88/82 |
| 3,043,709 | 7/1962 | Amborski | 428/421 X |
| 3,666,614 | 5/1972 | Snedeker et al. | 428/412 |
| 3,681,167 | 8/1972 | Moore | 428/412 X |
| 4,104,102 | 8/1978 | Eagon et al. | 428/913 X |
| 4,381,329 | 4/1983 | Dallmann | 428/204 |
| 4,382,109 | 5/1983 | Olson et al. | 428/331 |

Primary Examiner—Patricia C. Ives
Attorney, Agent, or Firm—Myron B. Kapustij; William F. Mufatti

[57] ABSTRACT

A laminar polycarbonate resin structure comprising a polycarbonate resin core lamina, an ultraviolet radiation absorbing back lamina bonded to the rear face of said core lamina, and a light reflecting front lamina bonded to the front face of said core lamina. This laminar structure is useful for making road signs and markers.

13 Claims, 3 Drawing Figures

LAMINAR STRUCTURE OF POLYCARBONATE

The instant invention is directed to laminar structures useful in the manufacture of road signs, markers, and informational signs. More particularly, the instant invention comprises a laminar structure containing (i) a core structure comprised of at least one polycarbonate resin lamina, (ii) an ultraviolet radiation protective back ply bonded to the rear face of said core structure, and (iii) a light reflecting front structure bonded to the front face of said core structure.

BACKGROUND OF THE INVENTION

Road signs, markers, and informational signs have traditionally been fabricated by cutting or shearing aluminum into blank sizes which are then individually post-coated with reflective materials. This is a costly, labor intensive process. Furthermore, the finished aluminum signs are subject to permanent deformation due to bending from vandalism and accidental causes.

Road signs and markers, and informational signs made from polycarbonate resin, rather than from aluminum, could overcome the problems of cost and permanent deformation associated with road signs fabricated from aluminum. However, polycarbonate road signs, due to the nature and characteristics of polycarbonate resin, suffer from sensitivity to reverse side impact degradation after exposure to ultraviolet radiation.

There thus exists a need for road signs and markers which are less costly than aluminum signs, are not subject to the permanent deformation exhibited by aluminum signs, and which do not exhibit the reverse side impact degradation after exposure to ultraviolet radiation of polycarbonate resin road signs. It is, therefore, an object of the instant invention to provide such signs.

DESCRIPTION OF THE INVENTION

The instant invention is directed to laminar structures useful in the manufacture of road signs and markers, and informational signs and the like. The invention involves three interrelated and critical requirements, and in order to obtain the improvements exhibited by the laminar structure of the instant invention it is essential to (i) utilize a core structure comprised of at least one polycarbonate resin lamina, (ii) protect the back or reverse surface of the core structure from degradation by ultraviolet radiation, and (iii) provide a visible light reflective surface on the front face of the core structure.

Figure 3:
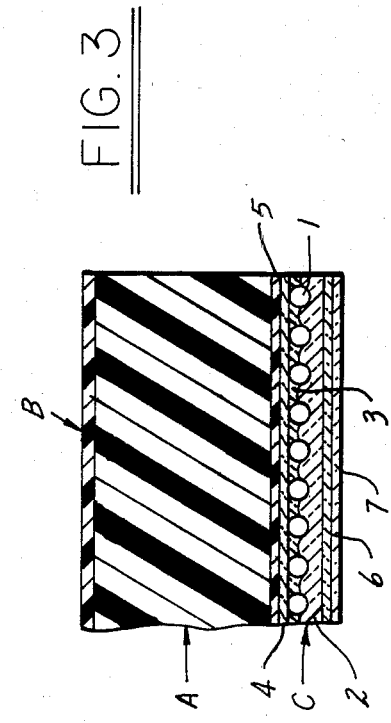
FIG. 3 is a fragmentary vertical section taken through lines 3—3 of the laminar structure shown in FIG. 1.

These three requirements are met by the laminar structure of the instant invention as illustrated in FIG. 3. As shown in FIG. 3 the laminar structure of the instant invention is comprised of an intermediate core structure A comprised of at least one polycarbonate resin lamina. Bonded to the back or reverse face of this core structure A is a back lamina B. This back lamina B has the function and acts to protect the underlying core structure A from ultraviolet radiation. Bonded to the front face of the core structure A ia a front laminar structure C which is visible light reflecting.

The core structure A is comprised of at least one lamina of polycarbonate resin. The polycarbonate resin useful in the practice of this invention is well known thermoplastic material which can be characterized as a high molecular weight aromatic carbonate polymer. This carbonate polymer has recurring structural units which may be represented by the general formula

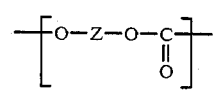

wherein Z is a divalent aromatic radical, i.e., the residue of a dihydric phenol employed in the polymer producing reaction. These carbonate polymers may generally be produced by the reaction of a dihydric phenol with a carbonate precursor such as a carbonyl halide, e.g., phosgene, a bishaloformate or a carbonate ester.

These polycarbonates, as well as methods for their preparation, are disclosed in U.S. Pat. Nos. 3,161,615; 3,220,973; 3,312,659; 3,312,660; 3,313,77; 3,666,614 and 3,989,672, all of which are hereby incorporated by reference.

The preferred polycarbonate resin is one which may be derived from the reaction of bisphenol-A with phosgene. This preferred polycarbonate resin contains recurring structural units represented by the general formula

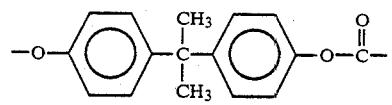

and have a weight average molecular weight in the range of from about 20,000 to about 100,000.

These polycarbonate resins may optionally have admixed therewith various commonly known and used additives such as inert fillers, impact modifiers, colorants, hydrolytic stabilizers, and the like. Some illustrative non-limiting examples of inert fillers include glass fibers, wood flour, clay, graphite, mica, silica, talc, and the like. Some illustrative non-limiting examples of impact modifiers include the thermoplastic elastomers such as rubber, acrylic rubbers, acrylonitrile-butadiene polymers, acrylonitrile-butadiene-styrene polymers, styrene-acrylonitrile polymers, styrene-butadiene polymers, butadiene rubbers, nitrile rubbers, polyolefin rubbers, and the like. Also optionally present may be the polyalkylene phthalates such as polybutylene terephthalate.

The back lamina B acts to protect the core polycarbonate structure A from the deleterious effects of ultraviolet radiation. These deleterious effects include, among others, the degradation of the impact strength of the polycarbonate resin. Thus, if the core polycarbonate structure A is exposed to ultraviolet radiation it will gradually, over a period of time, loose its impact strength and will be susceptible to breaking or permanent deformation upon impact. The back lamina B must thus be either opaque to ultraviolet radiation or contain and amount of ultraviolet radiation absorbers or stabilizers which effectively prevent transmission of ultraviolet radiation through said lamina B to the underlying polycarbonate core structure A.

The lamina B is generally comprised of a thin film of a plastic material which is compatible wit the underlying polycarbonate core structure A, i.e., it does not adversely affect the physical properties of the polycarbonate resin. Some non-limiting illustrative examples of materials which can be used in forming this thin film include acrylic and methacrylic polymers such as polymethylacrylate and polymethylmethacrylate; the organopolysiloxanes; the alpha olefins, e.g., polymers of ethylene, etc.; polyvinyl fluoride; polyvinylidene fluoride; polyethylene; polyesters; polyvinyl acetate; polyacrylamide; polyacrylonitrile; and the like.

If the film comprising lamina B is opaque to ultraviolet radiation it will usually contain an amount of pigment, such as for example, titanium dioxide, lamp black, chrome yellow, cadmium selenide red, phthalocyanine blue, phthalocyanine green, and the like, effective to render said film opaque to ultraviolet radiation. Generally, this amount is up to about 25–30% by weight, based on the amount of polymer used in making said film.

If lamina B is non-opaque, it must contain an amount of ultraviolet radiation absorbers or stabilizers effective to prevent transmission of ultraviolet radiation through said film to the underlying polycarbonate core structure A. The amount of ultraviolet radaiation absorbers effective to screen out the ultraviolet radiation is to some extent generally dependent upon the material used to formulate lamina B and upon the type of ultraviolet radiation absorber employed. Generally, however, amounts of ultraviolet radiation absorbers in the range of from about 0.5 to about 20% are effective in preventing transmission of ultraviolet radiation.

The ultraviolet radiation absorbers employed in the practice of this invention can be any of the known organic compounds which function by reason of their ability to screen out the damaging ultraviolet portion of light due to their very high absorptivity in this region of the spectrum. These compounds include, but are not limited to, the benzophenones, benzophenone derivatives, substituted benzophenone derivatives, benzotriazole, benzotriazole derivatives, benzoate esters, phenyl salicylates, derivatives of crotonic acid, malonic acid esters, and cyanoacrylates.

Ultraviolet radiation absorbers which fall into the benzophenone derivatives and the benzotriazole derivatives include those compounds disclosed in U.S. Pat. Nos. 2,976,259; 3,049,443 and 3,309,220, all of which are hereby incorporated herein by reference. Generally the benzophenone derivatives may be represented by the general formula

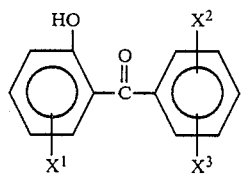

III.

wherein $X^1$, $X^2$ and $X^3$ are independently selected from hydrogen, halogen, alkyl, alkoxy and hydroxyl radicals.

Two non-limiting illustrative examples of derivatives of crotonic acid which function as ultraviolet radiation absorbers are alpha-cyano-beta-(p-methoxyphenyl)-crotonic acid methyl ester and alpha-cyano-beta-N-(2-methyl-indolinyl)-crotonic acid methyl ester.

The benzoate ester ultraviolet radiation absorbers include, but are not limited to, the $C_8$–$C_{20}$ alkyl and aryl benzoates, alkyl and aryl hydroxybenzoates, alkaryl and aralkyl benzoates, and alkaryl and aralkyl hydroxybenzoates.

The malonic acid esters which are effective ultraviolet radiation absorbers include the benzylidene malonates. These benzylidene malonates are represented by the general formula

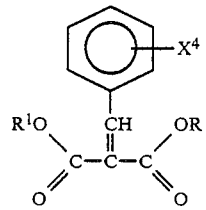

IV.

wherein $X^4$ is selected from hydroxyl, halogen, alkyl, hydrogen, and alkoxy radicals, and R and $R^1$ are independently selected from alkyl radicals, substituted alkyl radicals, aryl radicals, aralkyl radicals, alkaryl radicals, and substituted aryl radicals.

Among the cyanoacrylates which are useful ultraviolet radiation absorbers are those cyanoacrylates represented by the general formula

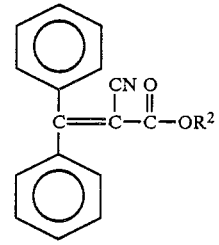

V.

wherein $R^2$ is alkyl or hydroxyalkyl. These compounds are disclosed in U.S. Pat. No. 4,129,667, which is hereby incorporated herein by reference.

A class of particularly useful ultraviolet radiation stabilizers, particularly when the lamina B is comprised of a polyester, an acrylic resin, or a polymer and copolymer of halo-olefin monomers, are polymers having the general formula

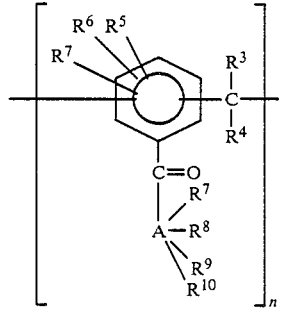

VI.

wherein $R^3$ and $R^4$ are selected from the group consisting of hydrogen, alkyl groups having 1 to 6 carbon atoms, chloroalkyl, furyl, vinyl, propenyl and phenyl;

$R^5$, $R^6$, $R^7$, $R^8$, $R^9$ and $R^{10}$ are selected from the group consisting of hydrogen, alkyl, alkoxy and halogen; A is an aryl radical; and n is an integer having a value of at least two. These compounds are disclosed in U.S. Pat. No. 3,330,884, which is hereby incorporated herein by reference.

Another particularly useful ultraviolet radiation absorber, particularly when lamina B is comprised of alpha olefins and the polar vinylidene monomer based polymers such as polyethylene, polymethylmethacrylate, polymethylacrylate, polyacrylamide, polyvinyl acetate, polyvinylidene fluoride, polyvinyl fluoride, polyvinyl chloride, and polyacrylonitrile, is a polymeric compound having recurring structural units of the formula

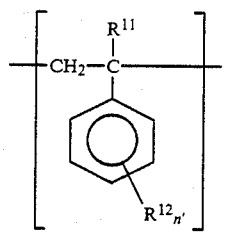

VII.

wherein $R^{11}$ is selected from the group consisting of hydrogen, halogen and alkyl; $R^{12}$ is selected from the group consisting of hydrogen, halogen, hydroxy, alkoxy and alkyl; and n' is a positive integer of from 1 to 3 inclusive; wherein at least 10% of said units of said polymeric compound have attached to the benzene ring a radical of the formula

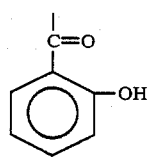

These ultraviolet radiation absorbers are disclosed in U.S. Pat. No. 3,418,397, which is hereby incorporated herein by reference.

A particularly useful lamina B is one which is comprised of an oriented polyvinyl fluoride film containing the ultraviolet radiation absorber of Formula VI. Such a polyvinyl fluoride film is disclosed in U.S. Pat. No. 3,330,884, which is hereby incorporated herein by reference. Another particularly useful lamina B is one which is comprised of an oriented polyvinyl fluoride containing the ultraviolet radiation absorber of Formula VII. Such a polyvinyl fluoride film is disclosed in U.S. Pat. No. 3,418,397, which is hereby incorporated herein by reference.

The front laminar structure C is a light reflective structure and may be any of the well known and commercially available light reflective structures such as, for example, those described in U.S. Pat. Nos. 3,994,086; 4,226,658; 2,407,680 and 4,025,674, all of which are hereby incorporated by reference. One useful light reflective laminar structure is that illustrated in FIG. 3. Such a reflex light reflecting structure is disclosed in the aforementioned U.S. Pat. No. 2,407,608. Briefly stated, this structure is comprised of an underlying flat back reflector 5 which has a light reflective face. Bonded to the reflective face thereof is a transparent spacing film 4, over which is bonded a transparent binder coating 3 in which a light returning layer of small transparent spheres 1 is partially embedded, so that the back extremities of the spheres touch or closely approach the underlying spacing film and the front extremities project beyond the binder coating. The spacing film and the binder coating constitute a transparent matrix which holds the spheres in fixed position and in definite predetermined uniform spaced relation to the underlying back reflector. Overlying the layer of spheres and binder coating is a transparent solid covering 2 which has a flat front (outer) face and which conforms to the underlying surface of the spheres and binder and is united thereto, thereby sealing in the layer of spheres and excluding atmospheric contact therewith. The spheres are thus surrounded in front and back by transparent solid material, and the front face of the reflex reflector is flat and not lenticular.

The spheres have a refractive index substantially higher than that of the transparent covering, which is essential to their proper functioning as convex lens elements to cause the necessary bending of incident and emergent light rays which, in combination with the reflective action of the back reflector on the light rays passing through the spheres, results in the desired reflex reflecting character of the reflector sheet.

The reflective structure may optionally have a transparent top sheet 6 laminated to the flat front face of the transparent covering 2 which overlies the layer of spheres. In a broad sense, this structure may be regarded as having a flat-front covering for the layer of spheres which is formed in two parts (i.e., layers 2 and 6 together constitute a transparent covering having a flat front face). This construction has the advantage of making it easier to provide a relatively thick total covering for the spheres.

The top sheet 6 may have the same refractive index as the covering layer 2, in which case the optical effect is equivalent to that of increasing the thickness of the covering layer 2. However, top layer 6 may have a different refractive index, either less than or greater than the refractive index of the underlying covering layer 2. This will not affect the refracting action of the spheres. Nor will there be any alteration in the angle with which angularly incident light rays strike the underlying spheres, for they will merely be bent in two steps instead of one step in passing from the atmosphere to the spheres, the end result being the same as though the top sheet 6 was not present.

The covering layer 2 may be chosen with particular reference to its ability to bond to the spheres, and to its refractive index relative to that of the spheres; whereas these are not factors in selecting the top sheet 6, and the latter may be chosen with particular reference to its weatherability, and to providing a surface especially adapted to receive printing or painting in the making of signs, i.e., layer 7 which represents a layer of print or paint.

It is to be understood that layer 7 need not be the outermost or surface layer in Lamina C. Thus, for example, layer 7 might be placed intermediate layers 2 and 6, intermediate layers 2 and 6, and the like.

Layer 7 may consist of paint, ink or screen-processing by which the appropriate printed information or designs are affixed to the lamina A so as to provide the road signs and markers of the instant invention.

The back reflector 5 may be of any suitable type. It may, for example, be a stiff or rigid base having a reflective surface; a flexible backing (cloth, paper or a film) having a reflective coating; a metal sheet or foil having a reflective surface (such as aluminum foil); a reflective metallic coating deposited on the back surface of the spacing film by electrodeposition or by spraying; or a thin binder coating containing a reflective pigment. It may be bonded to the spacing film as the result of any suitable coating or laminating procedure to produce a reflex reflector structure having an integral back reflector. The back reflector need not be of a uniformly reflecting nature over its whole area. It may be formed by printing, stencilling or painting process so that the surface presents desired insignia, designs or lettering, and certain areas may be non-reflective or black. In such a case the lamina A need not contain layer 7 which, as mentioned hereinafore, is comprised of printing or an informational design.

The spheres 1 may be comprised of transparent organic solid compositions of suitably high refractive index. In general inorganic types of glass are most useful and can be more easily made so as to have a high refractive index.

With respect to the sphere size, the upper practical limit is about 50 mils average diameter. The preferred size does not exceed about 10 mils average diameter.

Any conventional adhesives may be used to bond the laminae A, B and C together. These adhesives include, but are not limited to, polyvinylbutyrals, ethylene terpolymers, epoxies, polyurethanes, silicones, acrylics, and ethylene acrylic acids, among others. These adhesives may be pressure sensitive, heat sensitive, or both. Alternately, the laminae of the instant laminar structure may be heat bonded together. Since laminae B and C are generally commercially available they usually have an adhesive layer disposed on one surface thereof. These laminae are thus bonded to opposite sides or surfaces of lamina A by means of this adhesive. Thus, for example, lamina C has an adhesive layer disposed adjacent the outer surface of ply 5 and is bonded to lamina A by means of this adhesive layer interposed between ply 5 of lamina C and the surface of lamina A adjacent to and facing ply 5.

While in FIG. 3 the polycarbonate core structure A is shown as being comprised of a single monolithic lamina, it is to be understood that the core structure A may be comprised of two or more polycarbonate laminae bonded together by means of a suitable adhesive.

Preferably, the core structure A has a thickness in the range of from about 60 to about 250 mils. In general, if the thickness of the core structure A is less than about 60 mils, the laminar structure of the instant invention does not exhibit sufficient rigidity to perform satisfactorily as a road sign, marker, informational sign, and the like, particularly if it is relatively large, e.g., 12 inches by 18 inches or larger.

If the core structure A is less than about 60 mils thick, i.e., from about 30 to about 60 mils thick, it is still possible to utilize the laminar structures of the instant invention as road signs, markers, informational signs, and the like. In such an instance, however, it is preferred to use these laminar structures in conjunction with appropriate mounting or support devices. These mounting or support devices act to provide stiffening support to the laminar structures and impart thereto the requisite rigidity. Some nonlimiting illustrative examples of appropriate mounting or support devices are disclosed in U.S. Pat. Nos. 3,894,707; 4,066,233; 4,094,487; 4,125,240 and 4,211,381.

Even with laminar structures wherein the core structure A has a thickness greater than about 60 mils it is sometimes desirable, particularly with relatively large signs, to utilize the aforementioned mounting or support devices.

In the case where the laminar structures of the instant invention are to be fully supported, e.g., mounted on a building wall, sign backing, sign support, and the like, the core structure A may have a thickness of from about 2 to about 30 mils.

The upper thickness range of the core structure A is governed by such secondary considerations as economics, ease of mounting, appearance, and the like.

As mentioned hereinafore, the polycarbonate resin of which the core structure A is comprised may contain various fillers to reduce the cost thereof and additives such as impact modifiers to improve the impact strength and stiffness thereof. The polycarbonate resin may also be blended with other polymer systems, such as silicones, to increase its chemical resistance and to further improve its impact strength and/or stiffness. Alternately, the polycarbonate resin may be coextruded with other polymer systems. The polycarbonate resin may be in the form of a single solid monolithic layer or it may be in the form of structural sheet, i.e., hollow chanel, multiple wall sheet. The use of structural polycarbonate sheet has the advantage of providing increased strength at lower weight.

The instant laminar structure has the advantages of being less expensive than comparable aluminum structures, being resistant to permanent deformation due to vandalsim, accidental causes, high winds, and the like, and not suffering from reverse side impact degradation after exposure to ultraviolet radiation.

Figure 1:
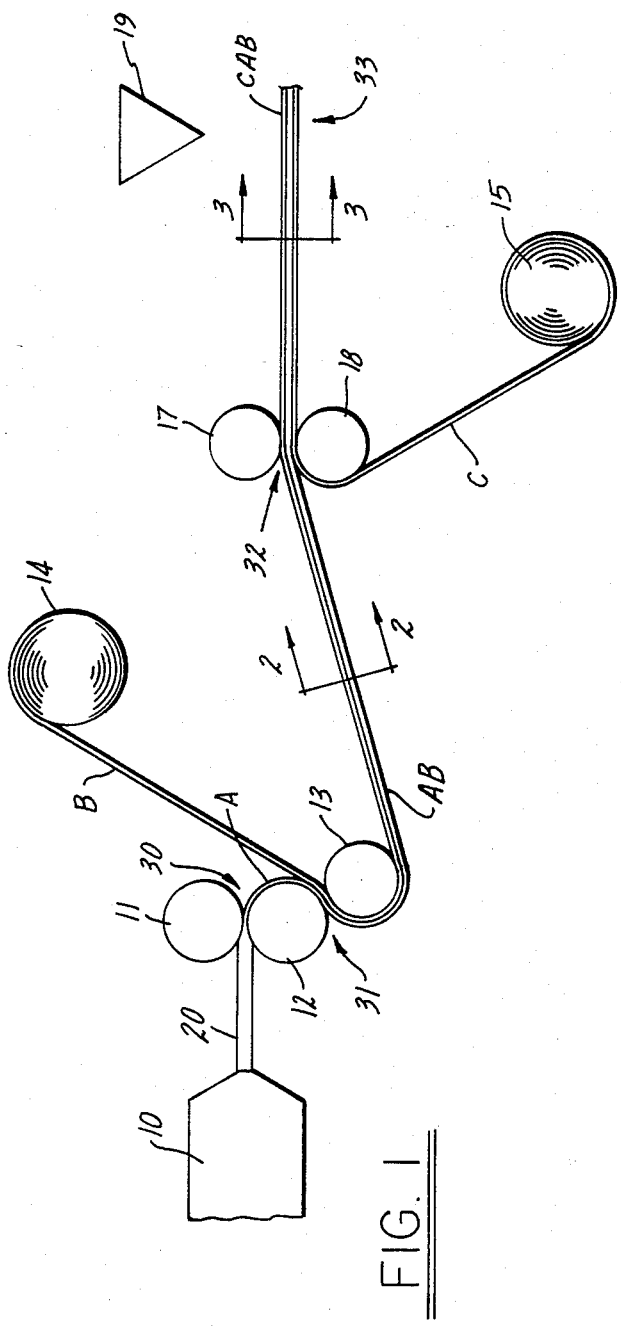
FIG. 1 is a diagramatic view of the apparatus for and the method of producing the laminar structures of the invention.

One, and the preferred, method of manufacture of the laminar structure illustrated in FIG. 3 is diagrammatically illustrated in FIG. 1. The process illustrated in FIG. 1 has the advantage of operating as a total in-line process, thereby resulting in reduced costs and labor.

Figure 2:
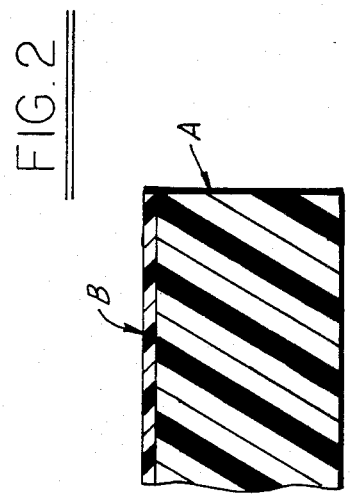
FIG. 2 is a fragmentary vertical section taken through lines 2—2 of the partial laminar structure shown in FIG. 1.

As illustrated in FIG. 1 one or more extruders 10 process a polycarbonate resin 20 which is passed to station 30 between polishing rollers 11 and 12 to form a flat sheet of polycarbonate resin having a controlled thickness, preferably between about 60 and 250 mils. This flat sheet A forms the core structure A of the laminar structure illustrated in FIG. 3. A commercially available ultraviolet radiation protective film B, which is either opaque to ultraviolet radiation or contains ultraviolet radiation absorbers in an amount effective to prevent transmission of ultraviolet radiation, and which forms the lamina B of the laminar structure of the instant invention, is mounted on roller 14 and is passed to station 31 and between rollers 11 and 12 where it is laminated to the back surface of sheet A by means of a suitable adhesive disposed on the surface of said film which is in contact with the surface of sheet A. The resultant partial laminar structure, AB, which is depicted in FIG. 2, is then passed to station 32. At station 32 a commercially available light reflective composite structure C is passed from roller 16 on which it is mounted and between rollers 17 and 18 where it is laminated, by means of a suitable adhesive disposed on the side thereof which is in contact with core structure A, to the surface of lamina A which is opposite the surface on which lamina B is diposed. The resulting laminate CAB, which is illustrated as the laminar structure of the instant invention in FIG. 3, is then passed to station 33 where it is cut into desired sizes by chopper 19.

While the structure and process described hereinafore are the most preferred embodiments of the instant invention, it is possible to modify these preferred embodiments to provide other laminar structures and processes for producing them which function with generally equal effectiveness as road signs and markers. Thus, for example, rather than bonding or laminating the ultraviolet radiation protective lamina B to the rear face of lamina A, it is possible to protect the rear face of lamina A from the deleterious affects of ultraviolet radiation by other means.

One of these means is by applying a thin layer of an ultraviolet radiation opaque paint, lacquer or varnish to the back face of lamina A, i.e., to the exposed surface of lamina A which is opposite to the face on which the light reflective lamina C is disposed. Thus, another embodiment of the instant invention is a laminar structure comprised of (i) a core polycarbonate structure containing at least one polycarbonate lamina, (ii) a front light reflective lamina bonded or laminated to the front side, i.e., the side receiving light as from passing vehicles, of the core structure; and (iii) a back ultraviolet radiation opaque layer disposed on the back side of said core structure, i.e., the side opposite the face having said light reflective lamina disposed thereon, said ultraviolet radiation opaque layer being selected from the group selected from ultraviolet radiation opaque paints, lacquers and varnishes.

Another means of protecting the back, exposed surface of core structure A from ultraviolet radiation is to impregnate the exposed or back surface layers of the polycarbonate core structure A with an ultraviolet radiation absorbing compound. There are several known methods by which this surface impregnation may be accomplished. One of these methods is disclosed in U.S. Pat. No. 3,309,220, which is hereby incorporated herein by reference. This method involves dipping the polycarbonate resin into a boiling water bath containing an ultraviolet absorbing compound for a period of time sufficient to effectively coat the surface of the article. The temperature of the bath is in the range of from about 90° C. to about 100° C. The water bath contains from about 0.5 to about 3% by weight of ultraviolet radiation absorbers.

Another method for impregnating the surface layers of the polycarbonate core structure with ultraviolet radiation absorbers is disclosed in U.S. Pat. No. 4,146,658, which is hereby incorporated herein by reference. This process comprises bringing the surface of the polycarbonate core structure into contact with a composition containing (i) an acrylate, (ii) a hydroxy ether, and (iii) an ultraviolet radiation absorber for a period of time sufficient for said ultraviolet radiation absorber to impregnate the surface of said polycarbonate but insufficient to substantially deleteriously affect the surface of said polycarbonate.

Yet another method for impregnating the surface layers of the polycarbonate core structure with an ultraviolet radiation stabilizer is disclosed in U.S. Pat. No. 3,043,709, which is hereby incorporated herein by reference. This process comprises the steps of applying to the surface of the polycarbonate a substituted benzophenone derivative ultraviolet radiation absorber and thereafter heating the treated surface to a temperature above the melting point of said ultraviolet radiation absorbing compound and below the melting point of the polycarbonate.

Still two other methods of impregnating the back surface of the core polycarbonate structure are those disclosed in U.S. patent application Ser. No. 187,507, filed Sept. 15, 1980, now U.S. Pat. No. 4,322,455, and U.S. patent application Ser. No. 187,508, filed Sept. 15, 1980, now U.S. Pat. No. 4,323,597, both of which are hereby incorporated herein by reference. The process disclosed in application Ser. No. 187,507 comprises heating the polycarbonate article and thereafter applying onto the heated surface of said polycarbonate an ultraviolet radiation stabilizing composition containing an ultraviolet radiation absorbing compound and a nonaggressive liquid carrier therefore. The temperature to which the polycarbonate is preheated is in the range of from about 65° C. to below about 150° C. The liquid carrier for the ultraviolet radiation absorbing compound is one which is nonaggressive towards the polycarbonate resin, i.e., does not attack and deleteriously affect the polycarbonate resin.

The process disclosed in application Ser. No. 187,508 comprises applying onto the surface of a polycarbonate resin an ultraviolet radiation stabilizing composition containing an ultraviolet radiation absorbing compound and a nonaggressive liquid carrier therefore, i.e., a liquid carrier which is nonaggressive towards the polycarbonate, and thereafter heating the polycarbonate to a temperature between about 65° C. to below about 150° C.

Thus, another embodiment of the instant invention is a laminar structure comprised of (i) a core polycarbonate resin structure comprised of at least one polycarbonate lamina, said structure having the back or exposed surface layers thereof impreganated with at least one ultraviolet radiation absorbing compound; and (ii) a front light reflecting lamina disposed on the face of the core structure opposite the surface thereof which is impregnated with the ultraviolet radiation absorbing compound.

DESCRIPTION OF THE PREFERRED EMBODIMENT

In order to more fully and clearly illustrate the present invention the following specific examples are presented. It is intended that the examples be considered illustrative of rather than limiting the invention disclosed and claimed herein. In the examples all parts and percentages are on a weight basis unless otherwise specified.

EXAMPLE 1

This example illustrates the manufacture of the laminar structure of the instant invention.

Polycarbonate resin pellets are fed into an extruder operating at about 540° F. and are extruded into sheet at the rate of about 11,000 to 13,000 lbs. per hour. The polycarbonate sheet is then passed between polishing rollers and formed into sheet about 80 mils thick. To one surface of this polycarbonate sheet is bonded a thin (about 1 mil thick) film of Tedlar (an oriented polyvinyl fluoride film containing dispersed therein at least one ultraviolet radiation absorbing compound marketed by E. I. du Pont de Nemours and Company). The Tedlar film has a pressure sensitive adhesive disposed on one surface thereof and is pressure bonded to the polycarbonate sheet by passing the polycarbonate sheet and the Tedlar film, with the adhesive carrying surface of the Tedlar being in contact with the polycarbonate sheet, between rollers. A light reflective structure in the form of relatively thin sheet is bonded to the surface of the polycarbonate sheet opposite that on which the Tedlar film is disposed. The light reflective sheet utilized is one marketed by Avery International under the tradename Fasign 1500, and is in the form of a relatively thin (about 7 mils thick) visible light reflective sheet. Bonding of this light reflective sheeting to the polycarbonate sheet is accomplished by bringing into contact with the surface of the polycarbonate sheet opposite the surface on which the Tedlar film is disposed the adhesive carrying surface of the light reflecting sheet and passing the two sheets bewteen rollers. The resulting laminar structure is then passed to cutting or chopping means wherein the laminar structure is cut into desired sizes.

The data in Table I demonstrates the difference that protecting the back surface of the polycarbonate core structure of the laminar structure of the instant invention from ultraviolet radiation makes on the retention of polycarbonate strength on reverse side impact. For the data in Table I test samples, both those having their reverse sides stabilized against ultraviolet radiation and those not having their reverse sides stabilized against ultraviolet radiation, were exposed to sunlight in Florida. Exposure was done with the samples facing 45° South. The impact of a 5 lb. steel ball on the "unexposed" side simulates a rock or other object hitting the front of the sign (the side with the light reflecting sheeting disposed thereon). Because of polycarbonate's notch sensitivity the reverse side impact is significantly more severe than an exposed side impact. For example, polycarbonate generally has a 17 ft.lbs./inch notched Izod impact strength. After one year in Florida unstabilized polycarbonate has only 1 ft.lb./inch of notched Izod while ultraviolet radiation stabilized polycarbonate maintains it's impact strength for more than three years. The numbers in Table I indicate the ft. lbs. of impact at which the polycarbonate samples fails (crack or break).

TABLE I

| 125 mil thick polycarbonate sheet | Weathering exposure time - Months | | | |
|---|---|---|---|---|
| | 0 | 6–12 | 24 | 36 |
| unstabilized polycarbonate | >200 | <50 | — | — |
| stabilized polycarbonate | >200 | >200 | >200 | >200 |

The data in Table II demonstrate the differences in permanent deformation caused by bending between the prior art aluminum sheets and the polycarbonate sheets of the instant invention. In obtaining the data in Table II 80 mil thick aluminum sheets and 80 mil thick polycarbonate sheets were mounted on tubular sign support members with each sheet having a 15 inch horizontal overhang extending laterally beyond one tubular sign support member. The overhanging portions of each sheet were then bent, in a horizontal direction around the tubular support member, for a certain distance and the permanent deformation noted. The horizontal displacement or bending of the overhanging portions are set forth in inches and degrees in Table II, along with the permanent deformation (in inches) caused by this bending of the aluminum and polycarbonate sheets.

TABLE II

| 80 mils thick sheet | Bending Displacement | | Permanent Deformation |
|---|---|---|---|
| | Inches | Degrees | |
| Aluminum | 5 | 20° | 3/16" |
| Aluminum | 7 | 28° | 2" |
| Polycarbonate | 15 | 90° | 0" |

As can be seen from the data in Table II the polycarbonate sheet shows no permanent deformation upon bending of the overhanging 15 inch portion to an angle of 90°, while the aluminum sheet is deformed upon bending of the overhanging portion to much lesser degrees.

The foregoing disclosure of this invention is not to be considered as limiting, since many variations may be made by those skilled in the art without departing from the scope or spirit of the foregoing description.

What is claimed is:

1. An improved light reflecting sign consisting essentially of, in combination:
   (i) a core structure having a rear face and a front face; and
   (ii) a front visible light reflecting laminate disposed on and bonded to said front face of said core structure; the improvement comprising said core structure being comprised of at least one ply comprised of a high molecular weight aromatic polycarbonate resin and having disposed on and bonded to said rear face thereof a back ultraviolet radiation protective ply.

2. The sign of claim 1 wherein said back ply is comprised of an organic polymeric material containing an amount of ultraviolet radiation stabilizer effective to prevent transmission of ultraviolet radiation to the underlying core structure.

3. The sign of claim 2 wherein said organic polymeric material is polyvinyl fluoride.

4. The sign of claim 3 wherein said ultraviolet radiation stabilizer is a polymer having the formula

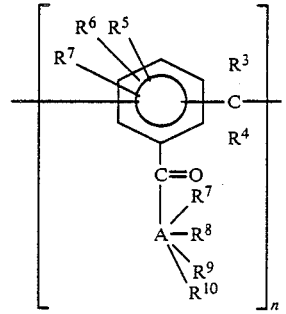

wherein $R^3$ and $R^4$ are independently selected from the group consisting of hydrogen, alkyl groups having 1–6 carbon atoms, chloroalkyl, and phenyl; $R^5$, $R^6$, $R^7$, $R^8$, $R^9$ and $R^{10}$ are independently selected from the group consisting of hydrogen, alkyl, alkoxy and halogen; A is an aryl radical; and n is an integer having a value of at least two.

5. The structure of claim 4 wherein $R^3$, $R^4$, $R^5$, $R^6$, $R^7$, $R^8$, $R^9$ and $R^{10}$ are hydrogen and A is a phenyl radical.

6. The sign of claim 4 wherein said polyvinyl fluoride back ply contains from about 0.1 to about 10% by weight of said ultraviolet radiation stabilizer.

7. The sign of claim 3 wherein said ultraviolet radiation stabilizer is a polymer having recurring structural units of the formula

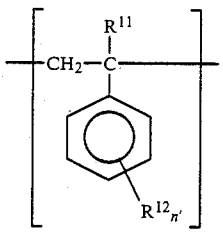

wherein $R^{11}$ is selected from the group consisting of hydrogen, halogen and alkyl; $R^{12}$ is selected from the group consisting of hydrogen, halogen, hydroxy, alkoxy, and alkyl; and $n'$ is a positive integer having a value of from 1 to 3 inclusive;

wherein at least 10% of said units of said polymeric compound have attached to the benzene ring a radical of the formula

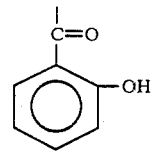

8. The sign of claim 2 wherein said front light reflective lamina is comprised of a light returning layer of small transparent spheres, internal light-reflecting means underlying said spheres and positioned so as to produce reflex reflection, and a continuous overlying transparent solid covering united and conforming to the front extremities of said spheres and having a flat front face.

9. The sign of claim 8 wherein said structure is a road sign or marker.

10. The sign of claim 1 wherein said back ply is opaque to ultraviolet radiation.

11. The sign of claim 10 wherein said back ply is comprised of polyvinyl fluoride containing an amount of pigments effective to render it opaque to ultraviolet radiation.

12. The sign of claim 11 wherein said front light reflective lamina is comprised of a light returning layer of small transparent spheres, internal light-reflecting means underlying said spheres and positioned so as to produce reflex reflection, and a continuous overlying transparent solid covering united and conforming to the front extremities of said spheres and having a flat front face.

13. The sign of claim 12 wherein said sign is a road sign or marker.

* * * * *